United States Patent Office.

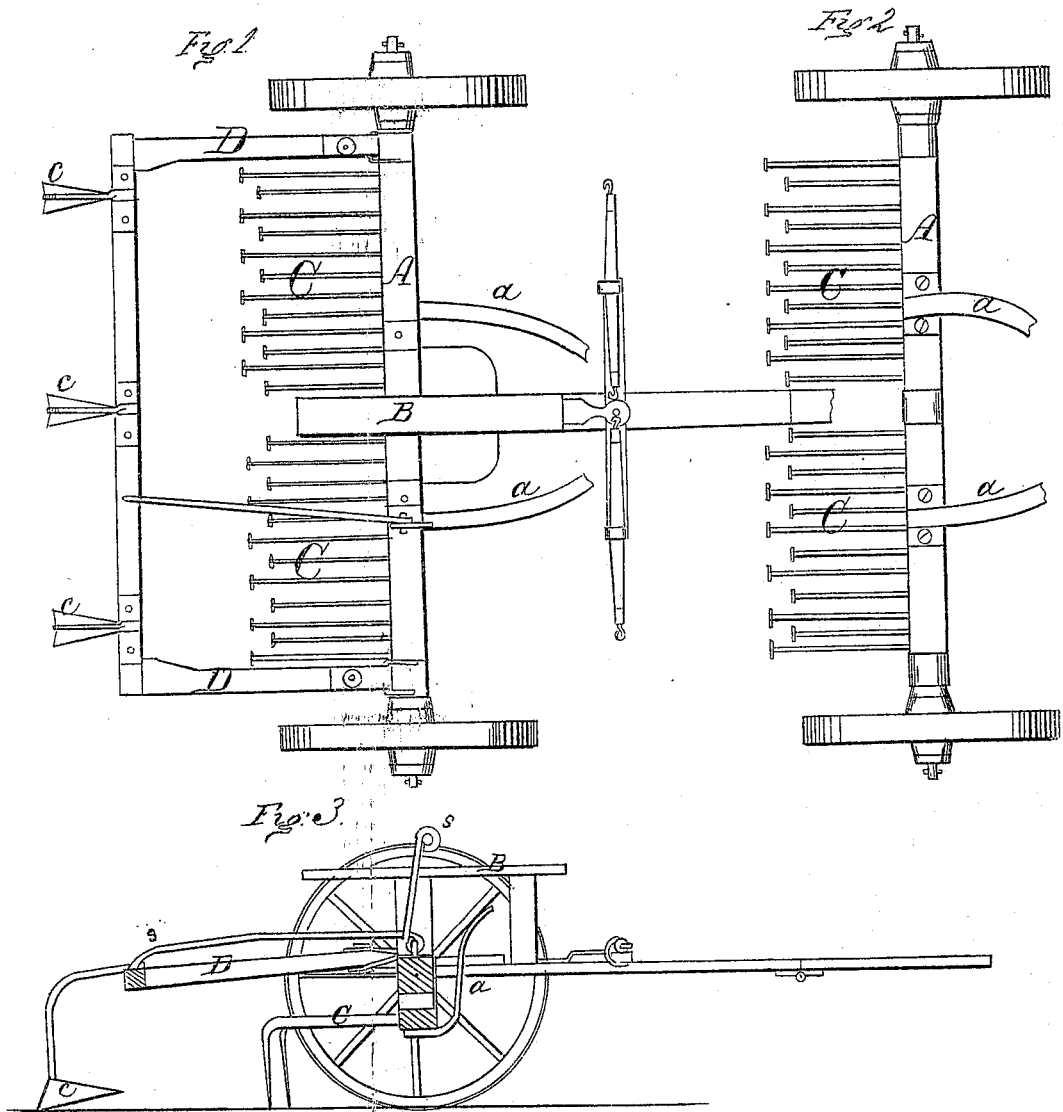

B. F. BARNEY, OF PONTIAC, ILLINOIS.

Letters Patent No. 93,038, dated July 27, 1869.

IMPROVEMENT IN COMBINED HARROW AND MARKER.

The Schedule referred to in these Letters Patent and making part of the same.

*To all whom it may concern:*

Be it known that I, B. F. BARNEY, of Pontiac, in the county of Livingston, and State of Illinois, have invented a new and valuable Improvement in Harrows and Markers; and I do hereby declare that the following is a full, clear, and exact description of the construction and operation of the same, reference being had to the annexed drawings making a part of this specification, and to the letters and figures of reference marked thereon.

Figure 1 of the drawings is a plan view of my device.

Figure 2 is a bottom-plan view of the same.

Figure 3 is a longitudinal section thereof.

My invention relates to harrows; and

It consists mainly in constructing a harrow of a peculiar form in two sections, and adjusting it to a sulky-carriage, so as to be raised or lowered by the driver's feet, and in combining therewith a marker for corn-rows, to be raised or lowered by the driver's hand.

The letter A of the drawings represents the axle of the carriage, and letter B is the driver's seat.

The letter C is a harrow formed in the shape of dragging-hooks, divided at its centre into two sections, each section being pivoted or hinged under the axle, and adjusted so as to be raised or lowered at will by the use of the foot-levers $a$ $a$.

The letter D is a frame hinged to the top of the axle, as shown, to the rear cross-bar of which I attach the marking-plows $c$ $c$ $c$.

The letter $s$ is a hand-lever, constructed in the form represented on fig. 3, passing through a staple on the top of the axle, and having its rear end firmly connected with the rear bar of the frame D.

By the use of this hand-lever, the driver raises or lowers marking-plows at will.

These devices furnish to the farmer a neat and convenient implement, by which the ground can be harrowed and marked for corn-rows at one and the same time, while the sectional harrow, with the foot-levers attached and the hand-lever connected with the marker, enables the operator to use the implement on stony or rooty ground.

What I claim as my invention, and desire to secure by Letters Patent, is—

The combination and arrangement of the sectional harrow C, marking-frame D, and levers $a$ and $s$, constructed and operating substantially as and for the purposes specified.

In testimony that I claim the above, I have hereunto subscribed my name, in the presence of two witnesses.

B. F. BARNEY.

Witnesses:
   C. L. BIGELOW,
   WILLIAM STEVENS.